Aug. 28, 1928.
C. F. BRANNOCK
1,682,366
FOOT MEASURING INSTRUMENT
Filed Nov. 4, 1925
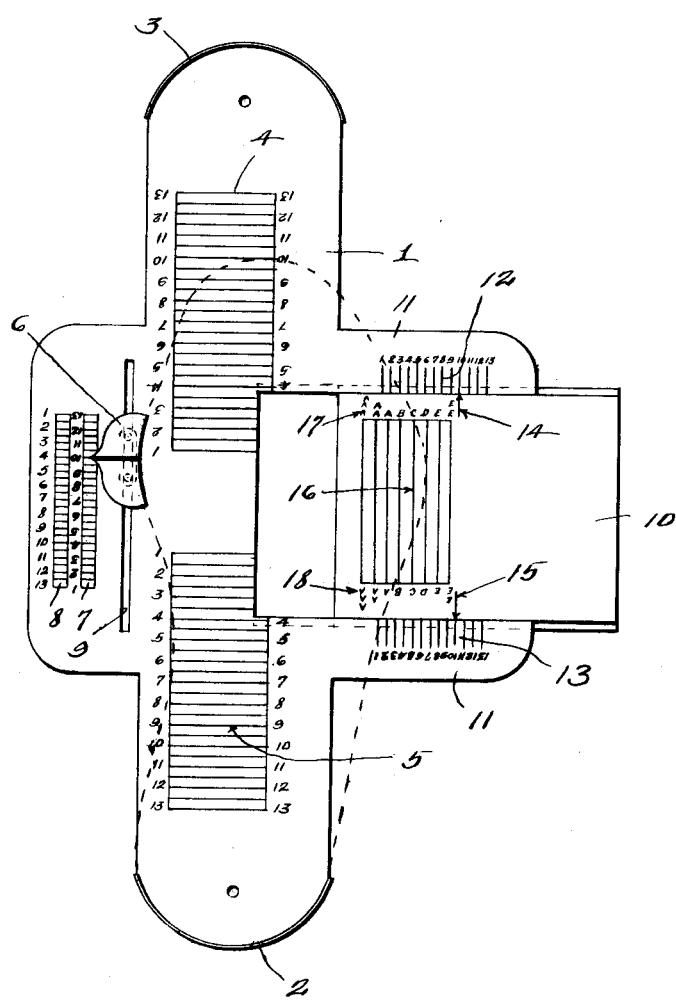
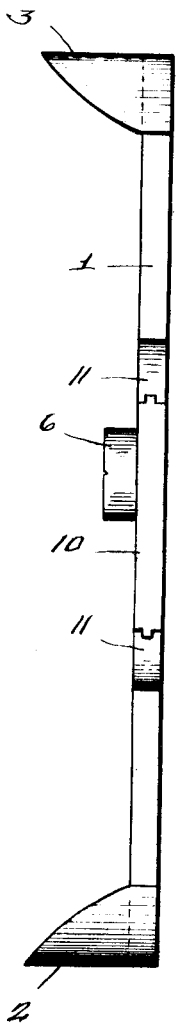
INVENTOR
Charles F. Brannock
BY
Parsons & Bodell
ATTORNEYS Patented Aug. 28, 1928.

1,682,366

UNITED STATES PATENT OFFICE.

CHARLES F. BRANNOCK, OF SYRACUSE, NEW YORK.

FOOT-MEASURING INSTRUMENT.

Application filed November 4, 1925. Serial No. 66,718.

This invention has for its object a foot measuring instrument for accurately measuring either foot to determine accurately the size of the shoe, both as to length and width, best suited for the foot being measured, which instrument is particularly simple in construction and easily operated and read by unskilled clerks whereby not only can the size of the shoe best adapted for a particular foot be readily determined but also the determination need not be made by an expert shoe fitter.

The invenion consists in the novel features and in the combinations and constructions hereinafter set forth and claimed.

In describing this invention, reference is made to the accompanying drawings in which like characters designate corresponding parts in all of the views.

Figure 1 is a plan view of a foot measuring instrument embodying my invention.

Figure 2 is an edge view thereof.

This instrument is here shown as adapted to measure both the right and left foot but may be of single construction or two instruments used one for the left foot and the other for the right foot. The instrument shown comprises a base plate having opposing heel abutments thereon and scales for indicating the length of the feet arranged in corresponding position to the abutments respectively, these scales being reversely arranged relatively to each other so that they are readable by the shoe fitter when measuring either the right or left foot; it further includes a single abutment arranged to engage the ball joint and movable along reversely arranged right and left scales corresponding to the former scales to indicate the length of the feet from heel to the ball joint, and a width finder member movable laterally relatively to, that is toward and from, the second abutment, it being guided in the base plate and having index marks movable along scales on the plate corresponding to the scales indicating the length of the foot. The latter scales are also arranged reversely relatively from each other to be read by the shoe fitter when measuring either the right or the left foot. The width finder member has width graduations arranged to come into alignment with the edge of the foot when the width finder member is set or shifted to a position corresponding to that indicated as the length of the foot on one of the first mentioned scales.

As before stated the instrument here shown is the double construction to measure right and left feet, but obviously may be of single construction.

1 designates the base plate which may be of any suitable form, size and construction and formed of any suitable material, it having heel abutments 2 and 3 at its opposite ends for the right and left foot respectively.

4 designates the scale for indicating the length of the right foot when against the abutment 2; and 5 is a similar scale for reading the length of the left foot when the heel is against the abutment 3.

These scales are so arranged as to be read by the shoe fitter when siting in front of, and facing, the person whose foot is being measured. Therefore, the scales 4 and 5 in order to be so readable are reversely arranged relatively to each other.

6 designates the second abutment for coacting with the ball joint, and as this instrument is here shown as double, this abutment 6 is located midway between the heel abutments 2, 3. The abutment 6 is also preferably adjustable along scales 7 and 8 for the right and left foot respectively. These scales correspond to the scales 4 and 5 and are reversely arranged relatively to each other so as to be readable by the shoe fitter when sitting in front of the person whose feet are being measured. The scales are so calibrated that for a perfect foot, the reading by the abutment 6 should be the same as that indicated as the length of the foot along the scale 4 or 5; for instance a foot measuring 10 along the scale 4 should measure 10 along the scale 7. However, this very seldom happens and when the shoe fitter adjusts the abutment 6 to the ball joint and it indicates along the scale 7 or 8 some length other than that indicated on the scale 4 or 5, the difference between the indications gives to the shoe fitter some information on which to determine the proper length of shoe.

The abutment 6 is here shown as adjustable lengthwise of the plate 1 along a slot 9. 10 designates the width finder member which is movable toward and from the abutment 6; it being here shown as slidably mounted in guides 11 in the plate 1 to move laterally. The plate 1 is provided with scales 12, 13 along the opposite sides of the guide 11 for the width finder 10, these scales being readable from opposite ends of the plate and corresponding to the scales 4, or 5, 7 or 8. The width finder member is formed with indices 14 and 15 movable respectively along the scales 12 and 13. The width finder is also formed with width indicating calibrations 16 arranged to come into alignment with the edge of the foot being measured, when the width finder is set and to indicate the width of the shoe required for the length indicated either by the scale 4—5 or 7—8. The width finder is provided with series of width readings 17 and 18 readable from opposite ends of the plate 1. Preferably, the width finder is set from the reading of the abutment 6.

In operation a person places one foot, as his right foot, on the plate 1 with his heel against the abutment 2 and the abutment 6 is moved along the scale 7. The readings on the scale 4 and 7 might be the same but usually are not the same; the difference in the reading conveys to the shoe fitter what shoe is required as to length to accurately fit the foot being measured. The shoe fitter moves the width finder 10 along the guide 11 until the index 15 points to the same number as that indicated on the scale 4 or by the abutment 6 on the scale 7. Preferably he takes the reading from the scale 7, he then notes the width line as "D" in line with the outer edge of the foot indicated in dotted lines in the drawing. The instrument shows that the particular foot requires a number 10 shoe "D" width. To measure the left foot the instrument is reversed and the heel of the left foot placed against the abutment 3 and the reading is made along the scales 5, 8 and 12.

This foot measuring instrument is particularly advantageous in that a comparatively unskilled shoe fitter or clerk can readily determine the exact size suited for the customer.

What I claim is:

1. A foot measuring instrument comprising a base plate formed with a heel abutment and having a scale arranged to measure the length of the foot from heel to the toe when the heel is against the abutment, a second abutment arranged to engage the ball joint, a width finder carried by the plate and shiftable toward and from the second abutment, the base plate having a second scale thereon along the path of the width finder and corresponding to the former scale and the width finder having an index movable along the second scale, the width finder also having width indicating graduations thereon arranged to come in line with the outer edge of the foot, and correlated with the graduations of the second scale.

2. The foot measuring instrument comprising a base plate formed with an abutment for the heel, a second abutment mounted on the plate and arranged to engage the ball joint, the second abutment being adjustable lengthwise of the plate and the plate having a scale along the path of the second abutment, and the second abutment having an index movable along the scale, a width finder carried by the base plate and movable toward and from the second abutment, the plate having a second scale extending along the path of the width finder and corresponding to the former scale, the width finder having an index movable along the second scale and also having width graduations correlated to the graduations of the second scale and arranged to come in line with the outer edge of the foot to indicate the width of the shoe required when the width finder is set along its scale in a position corresponding to the position of the second abutment along its companion scale.

3. A foot measuring instrument comprising a base plate formed with heel abutments at its opposite ends and with like scales arranged reversely relatively to each heel abutment to measure the length of the right and left foot from heel to toe respectively, a second abutment adjustable lengthwise of the plate between the two heel abutments to engage the ball joint of either the right or left foot, scales reading oppositely to each other on the base to indicate the length of the right and left foot respectively from heel to great toe joint along which the second abutment is adjustable, a width finder carried by the base plate and midway between the heel abutments, and adjustable laterally toward and from the second abutment, and the plate being provided with scales readable from opposite ends of the plate and arranged along the path of movement of the width finder and corresponding to the former scales, the width finder having index marks for coacting with these scales, the width finder having width graduations for coming into alignment with the edge of the foot when the width finder is set in a position corresponding to that indicated by the second abutment or that indicated on the first scale, as the length of the foot.

4. A foot measuring device comprising a base plate having means for indicating the length of the foot and a width indicator adjustable transversely of the base plate, the width indicator having width indicating graduations extending crosswise thereof, and the plate having length indicating graduations along the path of movement of the width indicator and the width indicator having a pointer movable along the said length graduations for determining the position in which the width indicator is to be set, the width indicating graduations being arranged to come in line with the side edge of the foot.

In testimony whereof, I have hereunto signed my name, at Syracuse, in the county of Onondaga, and State of New York, this 26th day of October, 1925.

CHARLES F. BRANNOCK.